(12) United States Patent  
Lintz et al.

(10) Patent No.: US 12,401,841 B2  
(45) Date of Patent: Aug. 26, 2025

(54) SYSTEMS AND METHODS FOR IMPROVING VIDEO PLAYBACK QUALITY

(71) Applicant: Comcast Cable Communications, LLC, Philadelphia, PA (US)

(72) Inventors: Christopher Lintz, Denver, CO (US); Derik Yarnell, Montrose, CO (US); Yasser Syed, La Crescenta, CA (US); Jiang Xu, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/048,616

(22) Filed: Oct. 21, 2022

(65) Prior Publication Data

US 2024/0137591 A1 Apr. 25, 2024  
US 2024/0236390 A9 Jul. 11, 2024

(51) Int. Cl.  
*H04N 21/239* (2011.01)  
*H04N 21/274* (2011.01)  
*H04N 21/658* (2011.01)

(52) U.S. Cl.  
CPC ....... *H04N 21/2393* (2013.01); *H04N 21/274* (2013.01); *H04N 21/6582* (2013.01)

(58) Field of Classification Search  
CPC ............ H04N 21/2393; H04N 21/274; H04N 21/6582  
See application file for complete search history.

(56) References Cited

U.S. PATENT DOCUMENTS

| | | |
|---|---|---|
| 11,228,792 B1 * | 1/2022 | Ram ...................... H04N 19/46 |
| 2012/0084463 A1 * | 4/2012 | Holden ............ H04N 21/25825 709/246 |
| 2018/0063591 A1 * | 3/2018 | Newman ................ H04N 21/44 |
| 2019/0116101 A1 * | 4/2019 | Harb ...................... H04L 41/50 |
| 2020/0092601 A1 * | 3/2020 | Bhattacharjee .. H04N 21/47214 |

* cited by examiner

*Primary Examiner* — Yassin Alata  
(74) *Attorney, Agent, or Firm* — BakerHostetler

(57) ABSTRACT

A first server device may store a first copy of a content item, and a second server device may store a second copy of the content item. A computing device may receive a request for the content item from a user device. The computing device may determine a user identifier associated with the user device and send, to the first and second server devices, the user identifier and an indication of the content item. The computing device may determine, based on a response by the first server device, at least one of a quality score or a recording score associated with the first copy of the content item, and the computing device may send, to the user device and based on the at least one of the first quality score or the first recording score, a portion of the first copy of the content item.

21 Claims, 6 Drawing Sheets

SYSTEMS AND METHODS FOR IMPROVING VIDEO PLAYBACK QUALITY

BACKGROUND

Content providers, for example video content providers, may provide content, for example video content, to users. Users may desire a way to view a recorded copy of live content at a different time, for example the user may not be able to view the content during a live presentation. Thus, the content provider may receive a request from a user to record a content item, and the content provider may store a copy of the content item. For example the content provider may store the copy of the content item at a cloud server. The user may request playback of the recorded content, and the system may provide the content to the user. Differences may arise in the quality of recordings of different copies of the same content. Thus, improvements are needed to increase the quality of content playback systems.

SUMMARY

Systems, methods, and apparatuses are described herein for providing optimal quality playback sessions in redundant systems. Whether a common copy or unique copy jurisdiction, content providers may store multiple recorded copies of a same content item, and the content providers may send any of the multiple copies of the same content item to the user in response to the user's request. Because different copies of the same content item may have differences in quality or differences in effectively capturing a source of the content item, one difficulty with the current technology lies in providing segments of a content item that are a high enough quality to satisfy the requesting user. Improvements are needed to determine quality associated with each stored copy of a content item prior to providing the content item to a user and to provide users with high quality recordings of content items. A system may determine a quality level associated with each copy of a plurality of copies of a content item. The system may determine the quality level of each copy of the content item at periodic intervals. The system may send, in response to a request from a user for the content item, one segment of one of the plurality of copies of the content item with a highest quality level. The system may monitor the quality level of each segment of each copy of the plurality of copies of the content item, and the system may switch from one copy of the content item to another copy of the content item to ensure a user receives a high quality segment of the content item.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of the disclosure.

BRIEF DESCRIPTION OF THE DRAWINGS

Aspects of the disclosure will now be described in detail with reference to the drawings, wherein like reference numbers refer to like elements throughout, unless specified otherwise.

DETAILED DESCRIPTION

Figure 1:
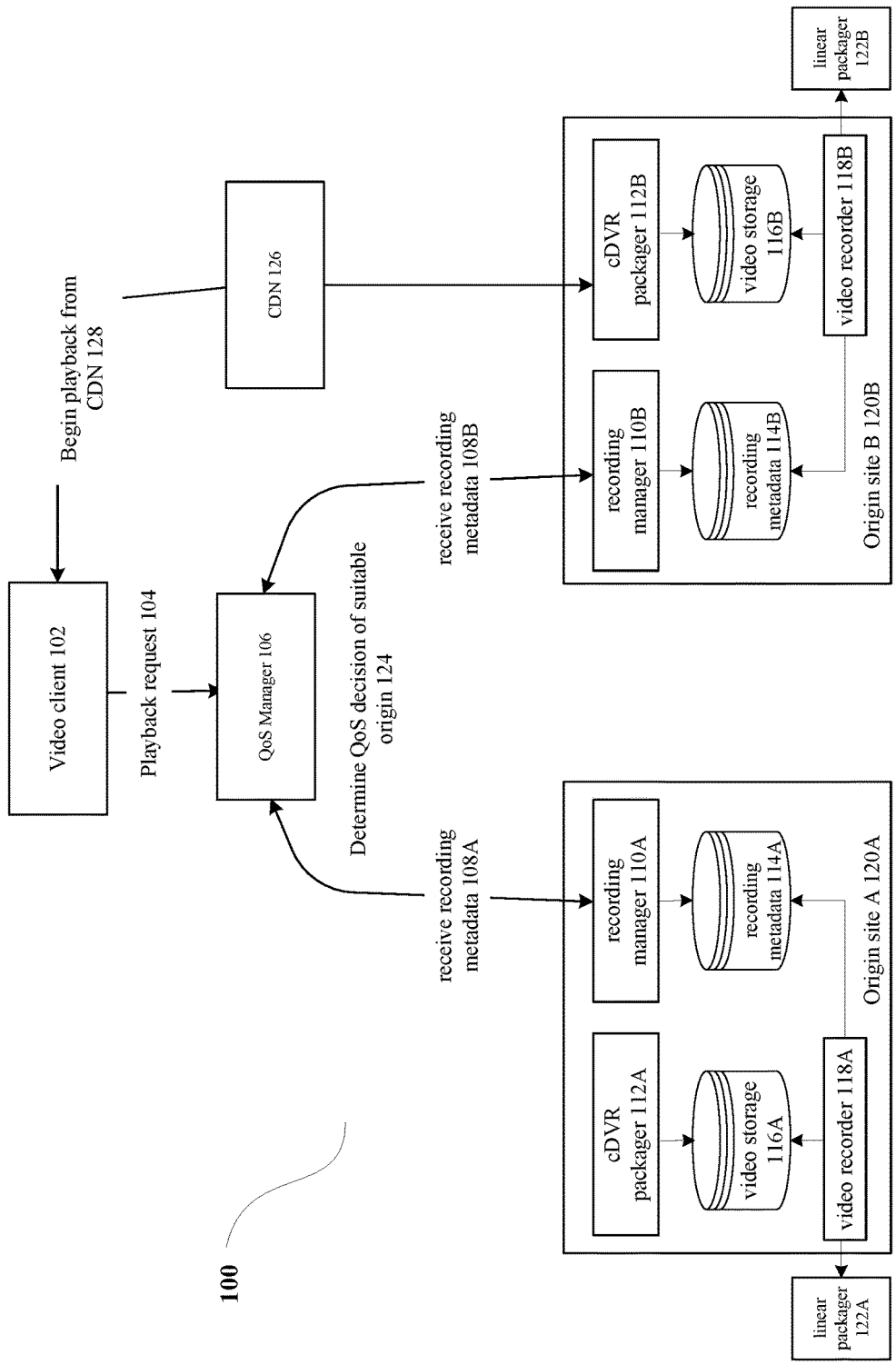
FIG. 1 shows an example system.

There are multiple types of jurisdictions in which content providers may provide content items, such as video recordings, to users. Each jurisdiction may have different rules or laws regarding the provision of content items to users. For example, in some jurisdictions, content providers may be required to store a unique copy of a content item in relation to every single request for a recording of the content item. For example, if ten different users request a recording of a same basketball game, the content provider may be required to store an individual, unique copy of a recording of the basketball game for each one of the ten requesting users. Such a system may require extremely high levels of recording and storage capabilities to manage the recording requirements for masses of users. For example, because certain popular television shows or sporting events may be viewed by millions of people, content providers may be required to store thousands, if not millions of unique recording copies of a same content item.

In other jurisdictions, for example in common copy jurisdictions, content providers may be able to provide a same recording of a content item to a number of users. For example, if ten different users request a recording of a same basketball game, the content provider may record a single copy of the basketball game. Then, when a user requests access to view the recording of the basketball game, the content provider may provide the single copy of the basketball game. Such a system does not necessarily require a same level of recording and storage capability as a jurisdiction that requires unique copies of a content item for each user. However, there remains a need to provide high quality versions of the content item to users to maintain a positive relationship with users. For example, a high quality copy of a content item may have a smaller quantity of visual artifacts in the copy of the content item than in a low quality copy of the content item. A high quality copy of the content item may have a smaller number of dropped or missing segments than a low quality copy of the content item. For example, a high quality video score may be associated with a copy of a video passed through a video transmission or processing system with a small quantity of perceived video degradation, for example video degradation associated with visual distortion or artifacts or missing segments. Therefore, in common copy jurisdictions, it may be desirable to record multiple copies, for example two copies, of the same content item to ensure redundancy in providing the recorded content item to any number of users. For example, if one of the recordings suffers from a poor quality, for example if one of the recordings has a significant quantity of distortion compared to the original content item, a redundant copy of the content item with a higher quality may allow the content provider to send a high quality copy of the content item to requesting users. In another example, a content item may be recorded in a series of segments. Each segment may have a chance of not being properly recorded by a video recorded, thus leading to a failed recorded segment. If a minimal quantity of segments are dropped in a video recording, the recording may not be noticeably worse than the original content. However, if a significant quantity of segments are dropped during video recording, the recording may be noticeably impacted by the dropped segments. Therefore, a redundant copy of a content item with less dropped segments may be provided to users rather than a different recording with more dropped segments. Additionally, any number of redundant copies of a content item may be recorded. For example, a content provider may record three distinct recordings of a requested content item, and a system may be provided to determine which of the three recordings should be sent to a requesting user.

A new system is desirable to ensure an optimal quality recording is provided to each user over time. For example, a first user may be communicating with the content provider via a fiber network, while a second user may be communicating with the content provider via a satellite network. Each recorded copy of the requested content item may be associated with slightly different properties, such as slightly different quality scores or segment counts across a period of time of each copy of the requested content. Based on a capability associated with a first user's user device, the first user may be optimally served by a different copy of the recorded content item than a second user's user device.

Additionally, the video quality (associated with the quality of a segment of a video in relation to a content item source material) and the recording quality (associated with the amount of segments of the recorded copy experiencing failure) may differ in a single recorded copy of a content item over a period of time. For example, at a first time, a first copy of the content item may be associated with a high video quality score. A high video quality score may be associated with a threshold limit on a quantity of visual distortion of the copy of the content item compared to the source material or a threshold limit on a quantity of failed segments of the recorded copy of the content item. However, due to any number of disruptions or errors, at a second time, the first copy of the content item may be associated with a low video quality score. For example, one disruption may be associated with one site receiving a source video stream over fiber while another site receives the source video stream over satellite, and the quality of recording may be different based on receiving the source stream via fiber versus satellite. For example, another disruption may be caused when multi-cast transport streams are dropped and not received by a packager, which may cause a lower quality recording of the content item. For example, another disruption may occur when network partitions cause software components to not receive video segments, or software components may experience a failure and not successfully recover in time to pull a segment of a recorded content item from a linear packager window. A second copy of the content item may be associated with a low video quality at the first time period, and the second copy of the content item may be associated with a high quality score at the second time period. Thus, it may be desirable to send the first copy of the content item to a requesting user at the first time period, and it may be desirable to send the second copy of the content item to the requesting user at the second time period.

Sending a first copy of the content item to the user for a first time period, and sending a second copy of the content item to the user for the second time period may be accomplished, at least in part, by a QoS Manager, for example QoS Manager 106. However, to switch from sending the user the first copy of the content item to the second copy of the content item during playback, a first transcoder associated with the first copy of the content item may be required to be synchronized with a second transcoder associated with the second copy of the content item. Additionally, or alternatively, to switch from sending the user the first copy of the content item to the second copy of the content item during playback, a first linear packager associated with the first copy of the content item may be required to be synchronized with a second linear packager associated with the second copy of the content item. Thus, the requesting user is not locked into receiving a single copy of a recorded content item for a duration of the user's interaction with the recorded content item. Allowing for the system to alter which copy of the recorded content item is sent to the user over time may provide for a higher quality experience for the user. The system described herein may be applied in both common copy and unique copy jurisdictions.

Switching from the first copy of the content item to the second copy of the content item during playback may require a signal, or trigger, to cause the switch to occur. For example, the switch may be signaled in a video manifest. For example, the first copy of the content item may be associated with a first video manifest. For example, the second copy of the content item may be associated with a second video manifest. The QoS Manager, for example QoS Manager 106, may generate a different video manifest comprising at least one of a portion of the first copy of the content item, a portion of the second copy of the content item, or a signal to switch from the first copy of the content item to the second copy of the content item for at least one of a specified time or for a specified interval. Additionally, or alternatively, the QoS Manager, for example QoS Manager 106, may determine that playback of the content item should occur via a single copy of the content item, for example, playback should occur completely via the first copy of the content item. Accordingly, the QoS Manager, for example QoS Manager 106, may send a redirect message to a manifest location of the manifest associated with the first copy of the content item.

Each of the redundant copies of the recorded content item may be stored at a single location, such as a single server device, for example a single cloud server device. However, some of, or each of, the copies of the recorded content item may be stored in separate locations, for example at separate server devices. Storing each of the copies of the recorded content item at separate locations may provide the system with a more robust defense against issues that may affect content providers from sending requested content items to users. For example, if each of the copies of the recorded content item are located at a same cloud server device, if the cloud server device experiences a disruption, the content provider may not be able to send any of the copies of the recorded content item to a requesting user. On the other hand, if each of the copies of the recorded content item are stored at different server devices, the content provider may still be able to send a copy of the recorded content item to a user if one of the server devices experiences a disruption. Thus, redundancy in the content provider system may improve efficiency and effectiveness in providing recorded content items to users.

Each copy of the recorded content item may be divided into a series of segments. For example, each segment may comprise one second of recording, two second of recording, four seconds of recording, six seconds of recording, ten seconds of recording, 15 seconds of recording, or the like. A series of segments, such as a linear series of segments, of a same length may be used to record a copy of the content item. A shorter segment length of a copy of the recorded content may be used to allow a more rapid change from one copy to a different copy. A longer segment length of a copy of the recorded content may be used to improve encoding efficiency or quality, for example.

Issues with video quality of recorded video content items may arise for any number of reasons. For example, if a first recording site receives a higher quality video stream via a fiber network connection, but a second recording site receives a lower quality video stream via a satellite network connection, the first recording site may generate a copy of the recorded content item in a higher quality. For example, a multi-cast transport stream may experience a disruption, and a packager may not receive portions of a recorded content item based on the disruption. Therefore, the packager may not be able to package a high quality recording of the content item for delivery to a user, and the user may receive a recording of the content item with a noticeable number of interruptions. For example, additional components within the system or at a user device may experience failures, and the failures may prevent the user device from receiving one or more segments of the recorded content item from the linear packager.

Additionally, other issues may arise if the system does not take into account quality of the recorded content item when determining which recording to send to a requesting user. For example, if a system does not take into account the quality of the copy of the recorded content item, the system may send a worst quality recording to a content delivery network (CDN) to cache the recording for future retrieval by a user. In the common copy case, the CDN may cache the worst quality recording of the content item and many users may access the cached copy of the recording, leading to sending a poor quality recording of the content item to numerous users. In some cases, users may end playback of the recording based on receiving a poor quality recording. Thus, a system is provided herein to determine a higher quality recording of a content item to send to a requesting user.

FIG. 1 shows an example system. The system may comprise a redundancy cloud system for recording content items, such as video content items and providing the recorded video content items to users. As show in this example, multiple copies of a content item may be recorded at multiple origin sites 120, such as origin site A 120A, origin site B 120B, and any other number of origin sites 120. A video client 102 may represent a user or a user device with a capability to playback a content item, such as a video content item. A quality of service (QoS) Manager 106 and a content delivery network (CDN) 126 may be located in a cloud, and the QoS Manager 106 and the CDN 126 may be in communication with any number of video clients 102. Linear packagers 122 may be provided to produce a segmented copy of a content item in any number of bit rates and formats.

The video client 102 may represent a user or a user device with a capability to receive and interact with a copy of a content item, such as a capability to playback a video content item. For example, the video client 102 may be implemented on any number of client devices, such as a set top box (STB), desktop computer, a laptop computer, a smartphone, a cellular phone, a personal digital assistant (PDA), a tablet, or the like. The video client 102 may be configured to receive only a single format of a recorded content item, or the video client 102 may be configured to receive any number of formats of recorded content items. For example, the video client 102 may be configured to receive recorded content items in a base media file format (BMFF), the video client 102 may be configured to receive recorded content items in a standard format determined by the Moving Picture Experts Group (MPEG), such as a transport stream (TS) defined by the MPEG, for example MPEG-TS, or the like. The video client 102 may be configured to receive the copy of the recorded content item and playback the copy of the recorded content item, for example a video content item.

At step 104, the video client 102 may send a playback request for a particular content manifest. The playback request may comprise a request to playback a recorded copy of the content item, and the content item may be a recording of a live program that took place previously. The recording of the content item may comprise a video recording of the content item. The video client 102 may send an indication of a device type of the video client 102 with the playback request. For example, the device type of the video client 102 may be a set top box. The set top box may be able to playback certain types of video content items, such as recorded video content items with particular formats and recording bit rates. Additionally, the video client 102 may send, with the playback request, one or more capabilities of the video client 102. For example, the capabilities may comprise a range of bit rates the video client 102 is capable of playing back. The QoS Manager 106 may determine a suitable recording of the content item based on at least one of the device type or the one or more capabilities associated with the video client 102.

The QoS Manager 106 may receive the playback request 104 from the video client 102, and the playback request 104 may comprise at least one of a device type of the video client 102 or at least one capability of the video client 102. The QoS Manager 106 may reside between the video client 102 and an origin site 120 in a cloud recording system. For example, the QoS Manager 106 may reside in between the video client 102 and a recording manager 110 in the cloud recording system. The QoS Manager 106 may receive any number of variables of QoS metadata and determine, based at least in part on the QoS metadata, a suitable origin site 120 to send the recorded content item to the video client 102. For example, the QoS Manager 106 may determine a suitable origin site 120 based at least in part on a video quality of the recorded content item, a device type associated with the video client 102, one or more capabilities associated with the video client 102, one or more capabilities associated with the origin site 120, and a network provider associated with the video client's 102 network. The QoS Manager 106 may send a request to a plurality of origin sites, for example origin site 120A and origin site 120B, to request recording metadata associated with a recording of the content item at each origin site 120.

The origin site 120 may comprise a plurality of components, and the origin site 120 may be configured to record, store, and transmit content item recordings. In FIG. 1, two origin sites are represented, origin site 120A and origin site 120B. Any number of origin sites 120 may be present, and each origin site 120 may be associated with a recording of the content item. A recording manager 110 may be in communication with the QoS manager 106 to receive requests regarding stored copies of recorded content items and send information regarding the received requests to the QoS Manager 106. For example, the recording manager 110 may determine, from a recording metadata 114 database, metadata regarding properties of recordings of a content item. For example, the recording manager 110 may receive a video quality associated with one or more segments of a recording of a content item via the recording metadata 114 database. The recording manager 110 may act as a communication point for the QoS Manager 106 to send requests regarding specific recorded content items.

The origin site 120 may further comprise a database to aggregate and store recording metadata 114 related to a plurality of recorded content items. For example, the recording metadata 114 database may comprise a video quality score associated with a recorded content item. The video quality score may represent a quality of the recorded content item compared to the quality of an original source of the content item. The video quality score may be determined by any number of methods. For example, a video quality score may be determined by evaluating the peak signal-to-noise ratio associated with the recorded content item. For example, the video quality score may be determined using a commercially available video quality assessor, such as the SSIMWave video experience automation suite to determine a quality level of a recorded video content item. For example, the video quality score may be determined via a video multimethod assessment fusion (VMAF) system. The VMAF system comprises an example of a full reference video quality metric. For example, a full reference video quality determination may be determined by comparing a recorded copy of a content item to an original source of the content item. Additionally, other non-reference methods may be used to determine the video quality score. For example, a non-reference method may not compare the recorded copy of the content item to the original source of the content item to determine the video quality score. A video quality score may be described as a number from 1 to 100, for example. A video quality score may be determined for each segment of the recorded content item. For example, a video quality score may be determined for each two-second segment of the recorded content item. A video quality score may be determined for each frame of a content item. The video quality score of each frame may be averaged over a period of time, such as two seconds, and the video quality score may be determined as an average of the video quality score of each frame of the content item. A recorded copy of a content item may also be given a video quality score over a different period of time. For example, a plurality of video quality scores associated with a plurality of segments of a recorded content item may be averaged over a particular period of time to determine a per period video quality score. For example, a per period video quality score may be determined for each quartile of the recorded content item. The per period video quality score for each quartile may represent an average video quality of the recording of the content item during each quartile.

The recording metadata 114 database may also comprise one or more segment counts associated with a recorded copy of a content item. A segment count may comprise a failed segment count and a successful segment count. A failed segment count may comprise information regarding a number of segments that failed to be recorded properly by a video recorder 118, or that failed to be properly included in the recorded content item. A successful segment count may comprise information regarding a number of segments that were successfully recorded by the video recorder 118, or that were successfully recorded in the recorded content item.

A video recorder 118 may receive a content item from a linear packager 122, as described in further detail below. The content item received from the linear packager 122 may comprise a video quality score associated with each period of the content item. For example, the video quality score may comprise an average video quality score for a one second period of the content item, a two second period of the content item, or the like. Each period of the content item may be associated with an individual video quality score. For example, each one second period of the content item received by the video recorder 118 may be associated with a video quality score. The video recorder 118 may record the content item for storage at the origin site 120. For example, the video recorder 118 may record the content item for storage at the video storage 116 database. The video recorder 118 may count a quantity of successful segments of the recorded content item during the recording of the content item. The video recorder 118 may count a quantity of failed segments of the recorded content item during the recording of the content item. The video recorder 118 may track how many, and which segments are associated with successes, and the video recorder 118 may track how many, and which segments are associated with failures. The video recorder 118 may send, to the recording metadata 114 database, the segment counts. For example, the video recorder 118 may send, to the recording metadata 114 database, the successful segment count and the failed segment count. As noted above, the QoS Manager 106 may determine which recorded copy of the content item may be sent to a video client 102 based at least in part on the successful segment count and the failed segment count.

The video recorder 118 may send the recorded content item to a video storage 116 database. The video storage 116 database may comprise a database of recorded content items. For example, if a single origin site 120 is used to store each of the copies of the content item, each of the recorded copies of the content item may be sent to a single video storage 116 database. However, multiple origin sites 120 may be utilized for recording multiple copies of a content item, such as origin site A 120A and origin site B 120B. A recorded content item recorded by video recorder 118A may be sent to video storage 116A database. A recorded content item recorded by video recorder 118B may be sent to video storage 116B database.

A cloud digital video recorder (cDVR) packager 112 may act as a DVR packager at a centralized server location, rather than a traditional DVR packager located in a local set top box associated with a single video client 102. For example, the cDVR packager 112A may be associated with origin site A 120A, and the cDVR packager 112A may package a copy of a content item for retrieval by any number of video clients 102A-102N from origin site A 120A. For example, a plurality of users may request playback of a content item. Each of the plurality of users may be directed to retrieve the content item as a recorded copy of the content item from origin site A 120A. The cDVR packager 112A may package a copy of the requested content item from the video storage 116A database to be retrievable by each of the plurality of users. For example, Each of the plurality of users may interact, directly or indirectly, with the cDVR 112A to retrieve the same copy of the content item. The cDVR 112A may package a copy of the content item in any number of streaming formats and at any number of different bit rates.

At step 108A and step 108B, the QoS Manager 106 may receive recording metadata from the recording managers 110A and 110B, respectively. For example, the QoS Manager 106 may receive metadata such as a video quality score associated with a recorded copy of a content item, a successful segment count associated with the recorded copy of the content item, and a failed segment count associated with the recorded copy of the content item. For example, the QoS Manager 106 may receive a quartile video quality score associated with the recorded copy of the content item. The quartile video quality score may indicate a video quality score associated with each quartile (i.e., quarter) or other time frames of the recorded copy of the content item.

At step 124, the QoS Manager 106 may determine a most suitable origin of a recorded copy of a content item to send to video client 102. For example, the QoS Manager 106 may receive recording metadata from origin site A 120A. The QoS Manager 106 may determine, based on at least one of a video quality score (e.g., a quartile video quality score) associated with a recorded copy of the content item at origin site A 120A, a segment success count associated with the recorded copy of the content item at origin site A 120A, a segment failure count associated with the recorded copy of the content item at origin site A 120A, a device type associated with the video client 102, at least one capability associated with the video client 102, or a network provider associated with the video client 102, a suitability of sending the recorded copy of the content item stored at origin site A 120A to the video client 102. The QoS Manager 106 may determine, based on at least one of a video quality score (e.g., a quartile video quality score) associated with a recorded copy of the content item at origin site B 120B, a segment success count associated with the recorded copy of the content item at origin site B 120B, a segment failure count associated with the recorded copy of the content item at origin site B 120B, a device type associated with the video client 102, at least one capability associated with the video client 102, or a network provider associated with the video client 102, a suitability of sending the recorded copy of the content item stored at origin site A 120A to the video client 102. The QoS Manager 106 may compare the suitability associated with each origin site 120, and the QoS Manager may determine an origin site 120 of the plurality of origin sites 120A and 120B most suitable to send the recorded copy of the content item to the video client 102.

For example, the QoS Manager 106 may determine the origin site B 120B is the most suitable origin site 120 to send the recorded copy of the content item to the video client 102. The CDN 126 may receive a copy of the content item stored at origin site B 120B, and the CDN 126 may cache the copy of the content item. Caching the copy of the content item at the CDN 126 may lessen latency in streaming the copy of the content item by video client 102 or any other video client requesting access to the copy of the content item. For example, the video client 102 may experience a larger latency when requesting playback of the copy of the content item directly from the origin site B 120B, rather than requesting access to the copy of the content item from the cache of CDN 126. At step 128, the video client 102 may begin playback of the copy of the content item from the CDN 126. The CDN 126 may cache the copy of the content item for a period of time, or the CDN 126 may cache the copy of the content item until a popularity of the content item wanes to a threshold level. A plurality of copies of a content item may be cached at a plurality of CDN's 126. For example, a first CDN 126 may cache a first copy of a content item, and a second CDN 126 may cache a second copy of a content item. Caching a plurality of copies of the content item may be desirable to facilitate rapid and efficient playback of popular content items.

The QoS Manager 106 may determine the origin site B 120B is the most suitable origin site 120 to send the recorded copy of the content item to the video client 102 for a first quartile of the copy of the content item. However, the QoS Manager 106 may determine the origin site A 120A is the most suitable origin site 120 to send the recorded copy of the content item to the video client 102 for a second quartile of the copy of the content item. A CDN 126 may cache a copy of the content item from origin site A 120A. The video client 102 may begin playback of the content via the copy of the content item stored at origin site B 120B. The video client 102 may continue playing back the copy of the content item from origin site B 120B for a duration associated with a first quartile of the content item. The video client 102 may switch to a recorded copy of the content item cached at a different CDN 126, wherein the recorded copy of the content item cached at the different CDN 126 may be stored at origin site A 120A, and the video client 102 may playback the copy of the content item from origin site A 120A for the duration of a second quartile of the content item.

Sending the copy of the content item from origin site B for the first quartile (or any other suitable time period), and sending the copy of the content item from origin site A for the second quartile may accomplished, at least in part, by QoS Manager 106. However, to switch from sending the user the copy of the content item from origin site B 120B to the copy of the content item from origin site A 120A during playback, a first transcoder associated with origin site B 120B may be required to be synchronized with a second transcoder associated with origin site A 120A. Additionally, or alternatively, to switch from sending the user the copy of the content item from origin site B 120B to the copy of the content item from origin site A 120A during playback, a first linear packager associated with the copy of the content item from origin site B 120B may be required to be synchronized with a second linear packager associated with the copy of the content item from origin site A 120A. Thus, the requesting user is not locked into receiving a single copy of a recorded content item for a duration of the user's interaction with the recorded content item. Allowing for the system to alter which copy of the recorded content item is sent to the user over time may provide for a higher quality experience for the user.

Switching from the copy of the content item from origin site B 120B to the copy of the content item from origin site A 120A during playback may require a signal, or trigger, to cause the switch to occur. For example, the switch may be signaled in a video manifest. For example, the copy of the content item from origin site B 120B may be associated with a first video manifest. For example, the copy of the content item from origin site A 120A may be associated with a second video manifest. The QoS Manager 106 may generate a different video manifest comprising at least one of a portion of the first manifest, a portion of the second manifest, or a signal to switch from the copy of the content item from origin site B 120B to the copy of the content item from origin site A 120A for at least one of a specified time or for a specified interval. Additionally, or alternatively, the QoS Manager 106 may determine that playback of the content item should occur via a single copy of the content item, for example, playback should occur completely via the copy of the content item from origin site B 120B. Accordingly, the QoS Manager 106 may send a redirect message to a manifest location of the manifest associated with the copy of the content item from origin site B 120B.

Figure 2:
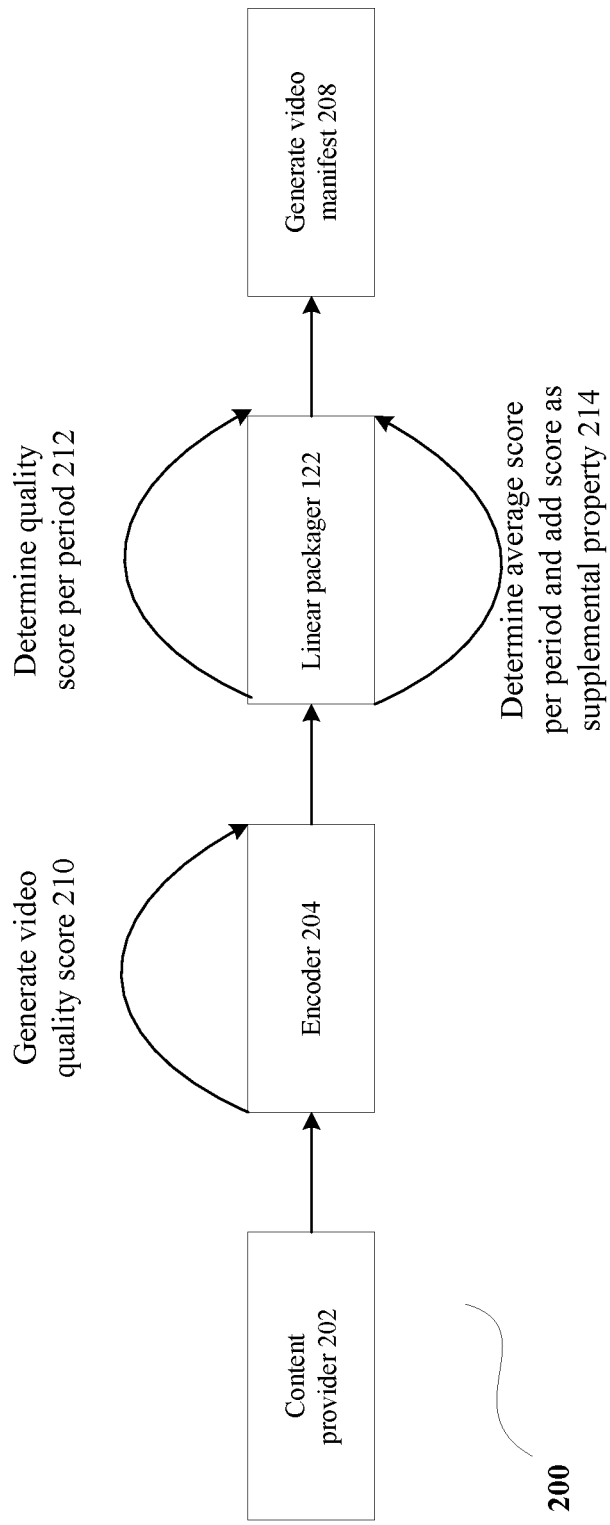
FIG. 2 shows an example method.

FIG. 2 shows a method. The method may be used for transcoding and packaging a content item received from a content provider 202. A video manifest 208 may be created for use by a video client, such as video client 102, to playback a recorded copy of the content item. A video quality score may be generated that is associated with the recorded copy of the content item. The content provider 202 may be any original source associated with a content item. For example, the content provider 202 may comprise a provider broadcasting a live broadcast of an event.

An encoder 204 may receive a video from the content provider 202. The encoder may receive an original source of the content item from the content provider 202 and compress the original source material into a compressed format. The encoder 204 may compress the original source material, which may lead to the inclusion of any number of errors in the encoded content item. For example, the encoder 204 may introduce one or more artifacts or a quantity of distortion as compared to the original source material. The distortion, artifacts, and any other changes to the original source material may be determined by any number of available tools. For example, a video quality score may be determined by evaluating the peak signal-to-noise ratio associated with the recorded content item. For example, the video quality score may be determined using a commercially available video quality assessor, such as the SSIMWave video experience automation suite to determine a quality level of a recorded video content item. For example, the video quality score may be determined via a video multimethod assessment fusion (VMAF) system. The VMAF system comprises an example of a full reference video quality metric. For example, a full reference video quality determination may be determined by comparing a recorded copy of a content item to an original source of the content item. Additionally, other non-reference methods may be used to determine the video quality score. For example, a non-reference method may not compare the recorded copy of the content item to the original source of the content item to determine the video quality score. A video quality score may be described as a number from 1 to 100, for example. A video quality score may be determined for each segment of the recorded content item. For example, a video quality score may be determined for each two-second segment of the recorded content item. A video quality score may be determined for each frame of a content item. The video quality score of each frame may be averaged over a period of time, such as two seconds, and the video quality score may be determined as an average of the video quality score of each frame of the content item. A recorded copy of a content item may also be given a video quality score over a different period of time. For example, a plurality of video quality scores associated with a plurality of segments of a recorded content item may be averaged over a particular period of time to determine a per period video quality score. For example, a per period video quality score may be determined for each quartile of the recorded content item. The per period video quality score for each quartile may represent an average quality of the recording of the content item during each quartile.

The encoder 204 may send the compressed copy of the content item to a linear packager 122. The compressed copy of the content item may be sent to the linear packager 122 via any number of streams. For example, the encoder 204 may send the compressed copy of the content item to the linear packager 122 via an MPEG-TS. For example, the encoder 204 may send the compressed copy of the content item to the linear packager 122 via a base media file format (BMFF). The encoder 204 may send an indication of the video quality score of each period of the copy of the content item to the linear packager 122. For example, the encoder 204 may send the compressed copy of the content item to the linear packager 122 via the MPEG-TS, and the video quality score may be indicated in at least one of an adaptation field of the transport stream or an encoder boundary point (EBP) descriptor.

The linear packager 122 may receive the compressed copy of the content item from the encoder 204. The linear packager may extract each quality score, and each quality score may be associated with an interval of the encoded copy of the content item. For example, the linear packager 122 may extract a video quality score associated with each two second interval of the encoded content item. The linear packager 122 may generate, based on the video quality scores associated with the intervals of the encoded content item, an average video quality content score associated with each period of the copy of the content item. The linear packager 122 may add the per period video quality score as a supplemental property in association with the related period of the copy of the content item. The linear packager 122 may generate a video manifest 208 comprising information associated with at least one encoded recording of the content item. For example, the encoder may encode the content item at a plurality of different bit rates, and the video manifest 208 may comprise an indication of each of the different encoded copies of the content item associated with each of the plurality of different bit rates. Each different encoded copy of the content item may be associated with a series of per period video quality scores, and the video manifest 208 may comprise the per period video quality scores associated with each of the different encoded copies of the content item, as well as the encoded copies of the content item. Video clients, such as video client 102 may request playback of a particular content item, and the system may provide a manifest with a plurality of versions of the encoded copy of the content item. The video client, such as video client 102 may determine a desired encoded copy of the content item and proceed to playback of the determined encoded copy of the content item.

Figure 3:
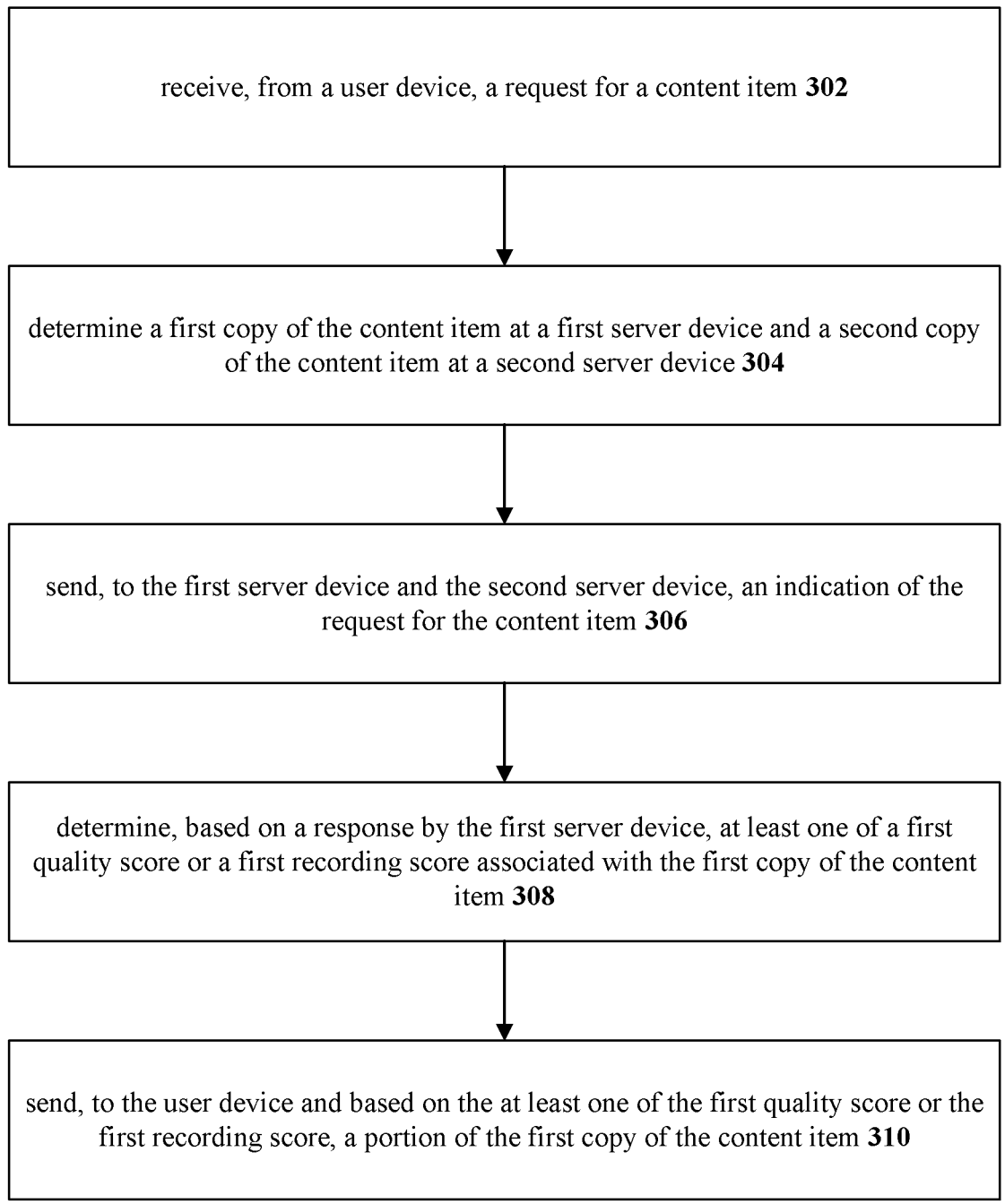
FIG. 3 shows an example method.

FIG. 3 shows an example method. The method described in FIG. 3 may be used by a content recording system to provide high quality playback of recorded content items in a redundant manner. For example, the method of FIG. 3 may be implemented by the system described in FIG. 1. The method of FIG. 3 may be performed, at least in part, by the QoS Manager 106. The method of FIG. 3 may take place at a cloud server system. The method of FIG. 3 may take place at a central server system. The system may comprise at least one server device.

For example, a first server device may store a first copy of a content item. For example, the first server device may comprise the origin site A 120A described in FIG. 1. The first server device may store the first copy of the content item in any suitable location at the first server device. For example, the first server device may store the first copy of the content item in a distributed storage system 116A. For example, a second server device may store a second copy of the content item. For example, the second server device may comprise the origin site B 120B described in FIG. 1. The second server device may store the second copy of the content item in any suitable location at the second server device. For example, the second server device may store the second copy of the content item in a distributed storage system 116B.

At step 302, the system may receive, from a user device, a request for the content item. For example, the user device may comprise the video client 102. For example, the user device may be a set top box, a personal computer, a laptop computer, a smartphone, a PDA, or the like. The system may receive a request to playback the content item at the user device. The system may receive a request to send the content item to the user device.

The system may determine a user identifier associated with the user device. For example, the system may determine an owner of the user device. For example, the user identifier may be associated with an owner of a set top box, a personal computer, a laptop computer, a smartphone, a PDA, or the like. The user may be allowed to access the system and request playback of content stored at the system. For example, the user may be a subscriber or customer associated with a content provider or service provider. The user may determine a particular content item the user desires to interact with. For example, the user may prefer to watch a sports game at a later time than a live broadcast of the sports game. The user may schedule the system to record the sports game so the user may watch the sports game at the later time.

At step 304, the system may cause an origin, such as origin site A 120A to record and store a copy of the sports game at the origin site A 120A so the user may interact with the content item at the later time. At the later time the user may request access to the content item, and the system may use the indication of the user identifier to determine which, if any, copies of content items are stored at the system for use by the user. At the later time the user may request access to the content item, and the system may use an indication of the request for the content item to determine which, if any copies of content items are stored at the system for use by the user. The system may cause a different origin, such as origin site B 120B to record and store a second copy of the sports game at origin site B 120B so the user may interact with the content item at the later time. At the later time the user may request access to the content item, and the system may use the indication of the user identifier to determine which, if any, copies of content items are stored at the system for use by the user. At the later time the user may request access to the content item, and the system may use an indication of the request for the content item to determine which, if any copies of content items are stored at the system for use by the user.

At step 306 the system may send, to the first server device and the second server device, at least one of the indication of the request for the content item or the user identifier associated with the user device. For example, the system may send the indication of the request for the content item to the first server device and the second device to determine which, if any, content items the request for the content item is associated with. For example, a user associated with the request for the content item may request access to playback a content item. The first server device and the second server device may determine, based at least in part on the request for the content item, a copy of the content item requested by the user.

At step 308, the system may determine, based on a response by the first server device, at least one of a first quality score or a first recording score associated with the first copy of the content item. For example, the system may determine, based on a level of degradation of the first copy of the content item, a first quality score of the first copy of the content item. The first quality score may be determined by any number of methods known in the art. For example, the system may determine the first quality score based on a peak signal-to-noise ratio of the copy of the content item. The first quality score may be determined based on any commercially available video quality assessor, such as the SSIMWave video experience automation suite, to determine a quality level of a recorded video content item. For example, the video quality score may be determined via a video multimethod assessment fusion (VMAF) system. The VMAF system comprises an example of a full reference video quality metric. For example, a full reference video quality determination may be determined by comparing a recorded copy of a content item to an original source of the content item. Additionally, other non-reference methods may be used to determine the video quality score. For example, a non-reference method may not compare the recorded copy of the content item to the original source of the content item to determine the video quality score. A video quality score may be described as a number from 1 to 100, for example. A video quality score may be determined for each segment of the recorded content item. For example, a video quality score may be determined for each two-second segment of the recorded content item or any other segment of the recorded content item. A video quality score may be determined for each frame of a content item. The video quality score of each frame may be averaged over a period of time, such as two seconds, and the video quality score may be determined as an average of the video quality score of each frame of the content item. A recorded copy of a content item may also be given a video quality score over a different period of time. For example, a plurality of video quality scores associated with a plurality of segments of a recorded content item may be averaged over a particular period of time to determine a per period video quality score. For example, a per period video quality score may be determined for each quartile of the recorded content item. The per period video quality score for each quartile may represent an average quality of the recording of the content item during each quartile.

A first recording score may be associated with a number of additional metadata related to the recorded copy of the content item. For example, the recording score may be associated with a number of segments of the content item successfully incorporated into the copy of the content item. For example, the recording score may be associated with a number of segments of the content item that experienced a failure and were not incorporated into the copy of the content item. The segment success and failure rate may be different between two different copies of a content item. The two different copies of the content item may be transcoded via different source streams, the transcoder may suffer a synchronization error when transcoding a portion of one of the copies of the content item, segments may be dropped throughout the transcoding and packaging process, or the like. Segment success and failure rates may be determined per period of time of the copy of the content item. A first segment of the copy of the content item may have a high segment success rate, while a second segment of the copy of the content item may have a high segment failure rate. Based on the video quality score and the recording score, the system may determine a suitable copy to send for playback by the user device.

At step 310, the system sends, to the user device and based on the at least one of the first quality score or the first recording score, a portion of the first copy of the content item. The system may determine a threshold suitability of the first copy of the content item based on the first quality score or the first recording score. The system may determine to send a first portion of the first copy of the content item to the user device. The system may determine a second portion of the first copy of the content item does not satisfy a threshold quality score or recording score, and the system may determine to send a second portion of the content item to the user device from a second copy of the content item from a different origin.

Figure 4:
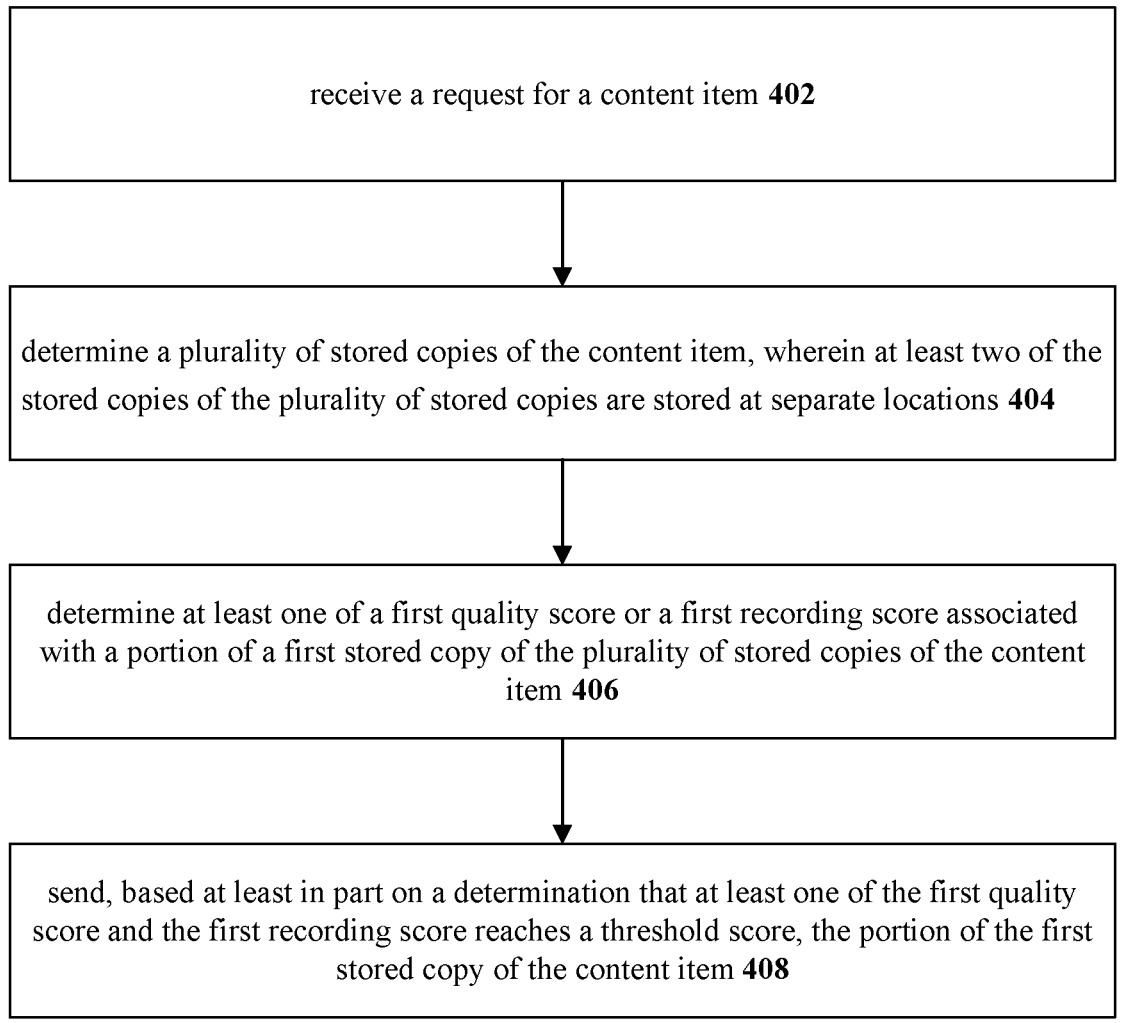
FIG. 4 shows an example method.

FIG. 4 shows an example method. The method described in FIG. 4 may be used by a content recording system to provide high quality playback of recorded content items in a redundant manner. For example, the method of FIG. 4 may be implemented by the system described in FIG. 1. The method of FIG. 4 may take place at a cloud server system.

The method of FIG. 4 may take place at a central server system. The system may comprise at least one server device.

At step 402, a system receives a request for a content item. For example, the system may receive a request for playback of a video content item at a user device associated with the request. For example, the request may be associated with the video client 102. For example, the request may be received from a set top box, a personal computer, a laptop computer, a smartphone, a PDA, or the like. The system may receive a request to playback the content item at the requesting device. The system may receive a request to send the content item to the device. The system may receive a request from a first device (e.g., a smartphone) to playback the requested content item at a second device (e.g., a set top box).

At step 404, the system determines a plurality of stored copies of the content item, wherein at least two of the stored copies of the plurality of copies are stored at separate locations. For example, the separate locations may comprise separate servers. The separate locations may comprise separate cloud servers. The separate locations may comprise an origin site A 120A and an origin site B 120B.

At step 406, the system may determine at least one of a first quality score or a first recording score associated with a portion of a first stored copy of the plurality of stored copies of the content item. For example, the system may determine, based on a level of degradation of the first copy of the content item, a first quality score of the first copy of the content item. The first quality score may be determined by any number of methods known in the art. For example, the system may determine the first quality score based on a peak signal-to-noise ratio of the copy of the content item. The first quality score may be determined based on any commercially available video quality assessor, such as the SSIMWave video experience automation suite, to determine a quality level of a recorded video content item. For example, the video quality score may be determined via a video multimethod assessment fusion (VMAF) system. The VMAF system comprises an example of a full reference video quality metric. For example, a full reference video quality determination may be determined by comparing an encoded copy of a content item to an original source of the content item. Additionally, other non-reference methods may be used to determine the video quality score. For example, a non-reference method may not compare the encoded copy of the content item to the original source of the content item to determine the video quality score. A video quality score may be described as a number from 1 to 100, for example. A video quality score may be determined for each segment of the recorded content item. For example, a video quality score may be determined for each two-second segment of the recorded content item. A video quality score may be determined for each frame of a content item. The video quality score of each frame may be averaged over a period of time, such as two seconds, and the video quality score may be determined as an average of the video quality score of each frame of the content item. A recorded copy of a content item may also be given a video quality score over a different period of time. For example, a plurality of video quality scores associated with a plurality of segments of a recorded content item may be averaged over a particular period of time to determine a per period video quality score. For example, a per period video quality score may be determined for each quartile of the recorded content item. The per period video quality score for each quartile may represent an average quality of the recording of the content item during each quartile.

A first recording score may be associated with additional metadata related to the recorded copy of the content item. For example, the recording score may be associated with a number of segments of the content item successfully incorporated into the encoded copy of the content item. For example, the recording score may be associated with a number of segments of the content item that experienced a failure and were not incorporated into the encoded copy of the content item. The segment success and failure rate may be different between two different copies of a content item. The two different copies of the content item may be transcoded via different source streams, the transcoder may suffer a synchronization error when transcoding a portion of one of the copies of the content item, segments may be dropped throughout the transcoding and packaging process, or the like. Segment success and failure rates may be determined per period of time of the copy of the content item. A first segment of the copy of the content item may have a high segment success rate, while a second segment of the copy of the content item may have a high segment failure rate. Based on the video quality score and the recording score, the system may determine a suitable copy to send for playback by the user device.

At step 408, the system may send, based at least in part on a determination that at least one of the first quality score or the first recording score satisfies a threshold score, the portion of the first stored copy of the content item. The system may determine whether to send the portion of the first stored copy of the content item based solely on the quality score, based solely on the recording score, or based on a combination of both the quality score and the recording score. Additional copies of the content item may also be associated with additional quality scores and additional recording scores. The system may determine to send the first stored copy of the content item based on a determination that at least one of the first quality score or the first recording score is greater than the additional quality scores or the additional recording scores. The portion of the first stored copy of the content item may be sent to a video client, such as video client 102.

Figure 5:
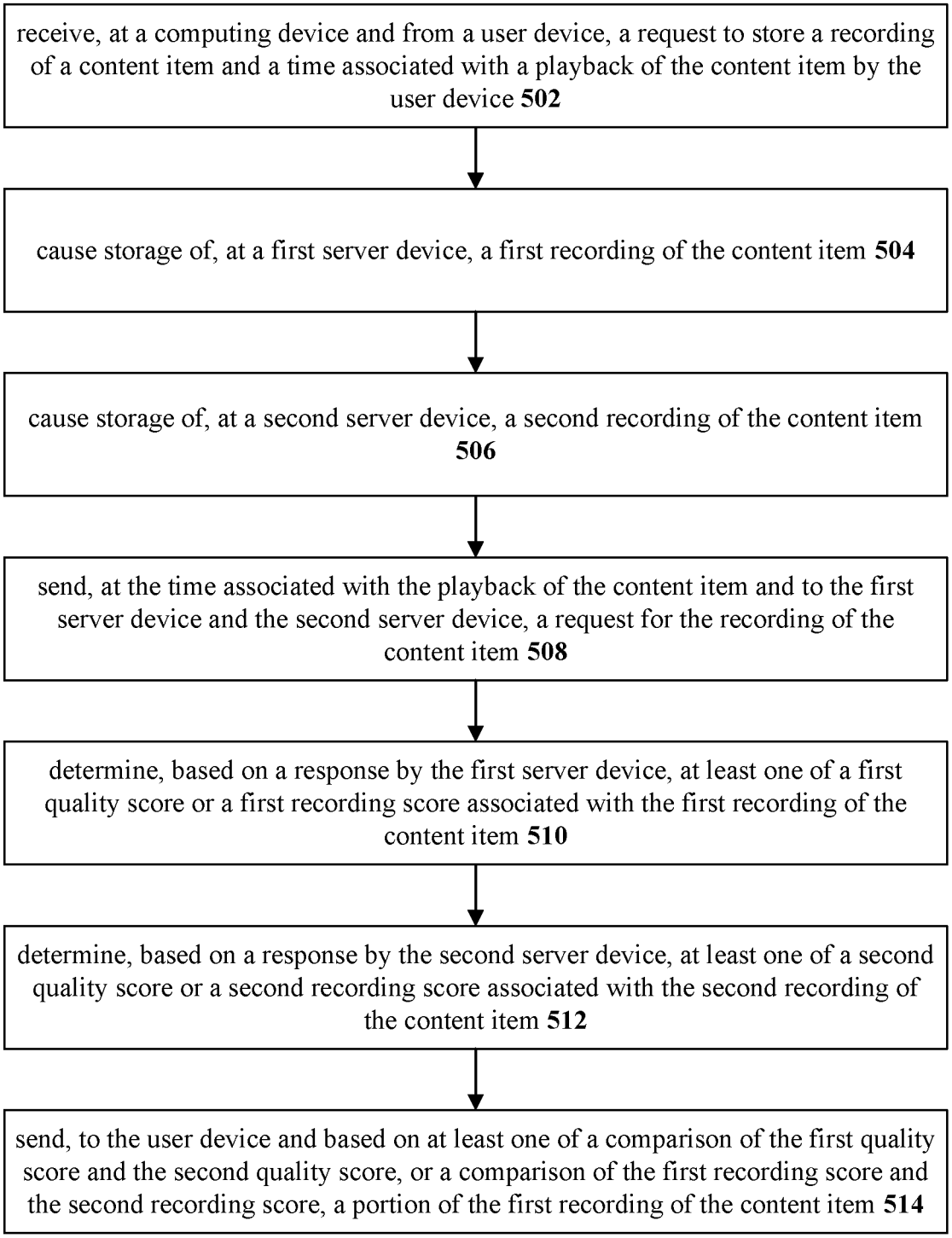
FIG. 5 shows an example method.

FIG. 5 shows an example method. The method described in FIG. 5 may be used by a content recording system to provide high quality playback of recorded content items in a redundant manner. For example, the method of FIG. 5 may be implemented by the system described in FIG. 1. The method of FIG. 5 may take place at a cloud server system. The method of FIG. 5 may take place at a central server system. The system may comprise at least one server device.

At step 502, a computing device may receive, from a user device, a request to store a recording of a content item and a time associated with a playback of the content item by the user device. For example, the user device may request the computing device to store a copy of a content item for later playback by the user device. For example, a user associated with the user device may desire to view a sports game but cannot view the sports game during a live portion of the game. The user device may send a request to the computing device to store a recording of the content item, and the user device may send a request to indicate a time at which playback is requested.

At step 504, a first server device may store a first recording of the content item. For example, the first server device may comprise the origin site A 120A described in FIG. 1. The first server device may store the first recording of the content item in any suitable location at the first server device. For example, the first server device may store the first recording of the content item in a video storage 116A database.

At step 506, a second server device may store a second recording of the content item. For example, the second server device may comprise the origin site B 120B described in FIG. 1. The second server device may store the second recording of the content item in any suitable location at the second server device. For example, the second server device may store the second recording of the content item in a video storage 116B database.

At step 508, the system may send, at the time associated with the playback of the content item, and to the first server device and the second server device, a request for the recording of the content item. For example, the first server device may store a first recording of the content item, while the second server device may store a second recording of the content item. The system may determine one of the at least one recordings of the content item to send to the user device for playback. The system may send, with the request for the recording of the content item, at least one of a request for a quality score or a request for a recording score associated with each one of the first and second recordings of the content item.

At step 510, the system may determine, based on a response by the first server device, at least one of a first quality score or a first recording score associated with the first recording of the content item. For example, the system may determine, based on a level of degradation of the first recording of the content item, a first quality score of the first copy of the content item. The first quality score may be determined by any number of methods known in the art, for example by a peak signal-to-noise ratio, by a SSIMWave video experience automation suite, by a VMAF system, or the like. A video quality score may be described as a number from 1 to 100, for example. A video quality score may be determined for each segment of the recorded content item. For example, a video quality score may be determined for each two-second segment of the recorded content item. A video quality score may be determined for each frame of a content item. The video quality score of each frame may be averaged over a period of time, such as two seconds, and the video quality score may be determined as an average of the video quality score of each frame of the content item. A recorded copy of a content item may also be associated with a video quality score over a different period of time. For example, a plurality of video quality scores associated with a plurality of segments of a recorded content item may be averaged over a particular period of time to determine a per period video quality score. For example, a per period video quality score may be determined for each quartile of the recorded content item. The per period video quality score for each quartile may represent an average quality of the recording of the content item during each quartile.

A first recording score may be associated with additional metadata related to the first recording of the content item. For example, the recording score may be associated with a number of segments of the content item successfully incorporated into an encoded copy of the content item. For example, the recording score may be associated with a number of segments of the content item that experienced a failure and were not incorporated into the first recording of the content item. The segment success and failure rate may be different between two different copies of a content item. The two different copies of the content item may be transcoded via different source streams, the transcoder may suffer a synchronization error when transcoding a portion of one of the copies of the content item, segments may be dropped throughout the transcoding and packaging process, or the like, leading to differences in segment success and failure rates. Segment success and failure rates may be determined per period of time of the recording of the content item. A first segment of the first recording of the content item may have a high segment success rate, while a second segment of the first recording of the content item may have a high segment failure rate. Based on at least one of the video quality score or the recording score, the system may determine a suitable copy to send for playback by the user device.

At step 512, the system may determine, based on a response by the second server device, at least one of a second quality score or a second recording score associated with the second recording of the content item. For example, the system may determine, based on a level of degradation of the second recording of the content item, a second quality score of the second copy of the content item. The second quality score may be determined by any number of methods known in the art, for example by a peak signal-to-noise ratio, by a SSIMWave video experience automation suite, by a VMAF system, or the like. A video quality score may be described as a number from 1 to 100, for example. A video quality score may be determined for each segment of the recorded content item. For example, a video quality score may be determined for each two-second segment of the recorded content item. A video quality score may be determined for each frame of a content item. The video quality score of each frame may be averaged over a period of time, such as two seconds, and the video quality score may be determined as an average of the video quality score of each frame of the content item. A recorded copy of a content item may also be associated with a video quality score over a different period of time. For example, a plurality of video quality scores associated with a plurality of segments of a recorded content item may be averaged over a particular period of time to determine a per period video quality score. For example, a per period video quality score may be determined for each quartile of the recorded content item. The per period video quality score for each quartile may represent an average quality of the recording of the content item during each quartile.

A second recording score may be associated with additional metadata related to the second recording of the content item. For example, the second recording score may be associated with a number of segments of the content item successfully incorporated into an encoded copy of the content item. For example, the second recording score may be associated with a number of segments of the content item that experienced a failure and were not incorporated into the second recording of the content item. The segment success and failure rate may be different between two different copies of a content item. The two different copies of the content item may be transcoded via different source streams, the transcoder may suffer a synchronization error when transcoding a portion of one of the copies of the content item, segments may be dropped throughout the transcoding and packaging process, or the like, leading to differences in segment success and failure rates. Segment success and failure rates may be determined per period of time of the recording of the content item. A first segment of the second recording of the content item may have a high segment success rate, while a second segment of the second recording of the content item may have a high segment failure rate. Based on at least one of the second video quality score or the second recording score, the system may determine a suitable copy of the content item to send for playback by the user device.

At step 514, the system may send, to the user device and based on at least one of a comparison of the first quality score and the second quality score, or a comparison of the first recording score and the second recording score, at least a portion of the first recording of the content item. The system may determine whether to send the portion of the first stored copy of the content item based solely on the comparison of the first quality score and the second quality score, based solely on the comparison of the first recording score and the second recording score, or based on a combination of both the comparison of the first and second quality scores and the comparison of the first and second recording scores. Additional recordings of the content item may also be associated with additional quality scores and additional recording scores. The system may determine to send the first recording of the content item based on a determination that at least one of the first quality score or the first recording score is greater than the second, or additional, quality scores or the second, or additional, recording scores associated with the second, or additional, recordings of the content item. The portion of the first recording of the content item may be sent to a video client, such as video client 102, for playback.

Figure 6:
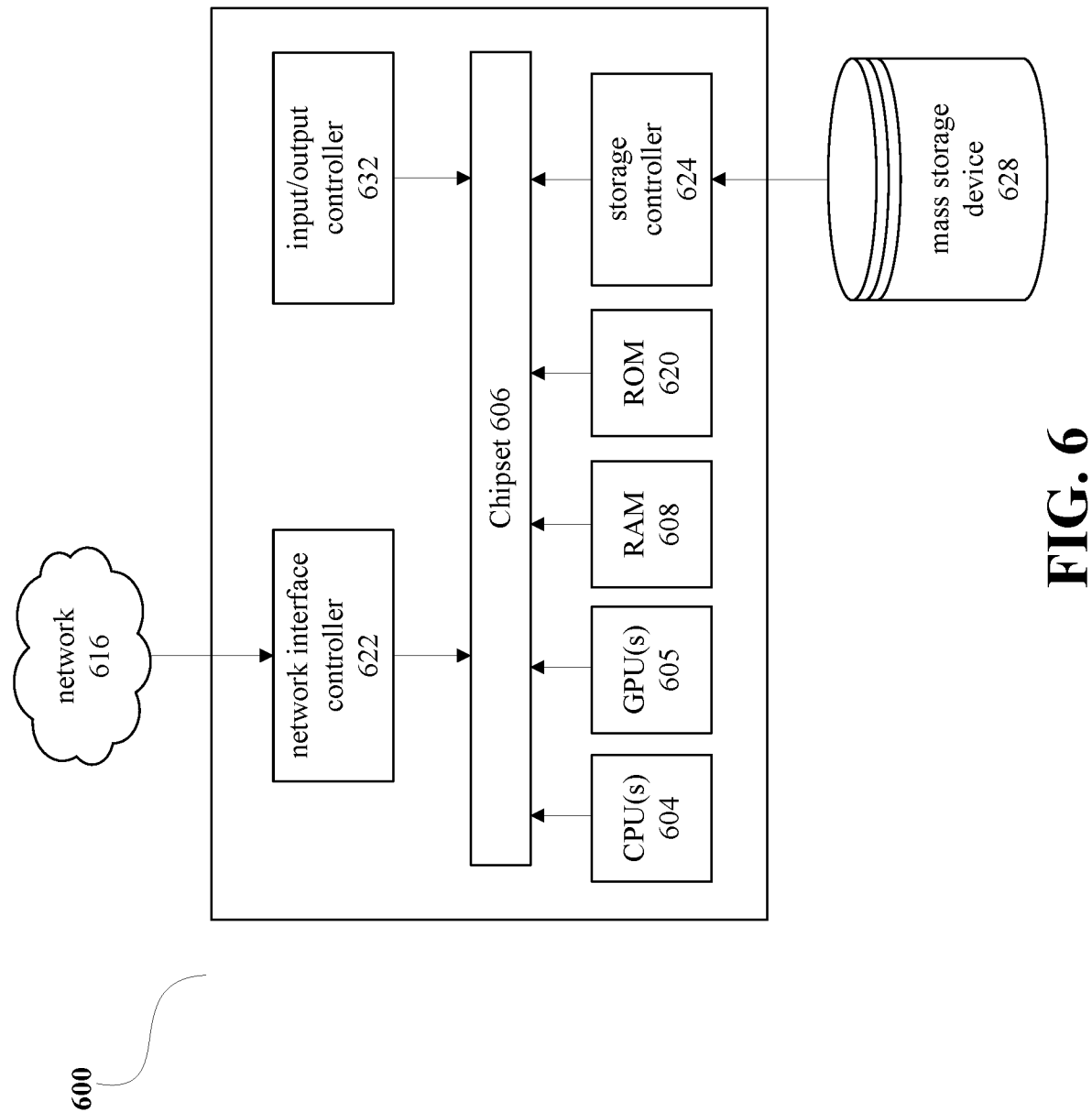
FIG. 6 shows an example computing system.

FIG. 6 shows an example computing device 600 that may represent any of the various devices or entities shown in FIG. 1, including, for example, the video client 102, the QoS manager 104, the Origin Site 110, the CDN 106, or a database. That is, the computing device 600 shown in FIG. 6 may comprise any smartphone, server computer, workstation, access point, router, gateway, tablet computer, laptop computer, notebook computer, desktop computer, personal computer, network appliance, PDA, e-reader, user equipment (UE), mobile station, fixed or mobile subscriber unit, pager, wireless sensor, consumer electronics, or other computing device, and may be utilized to execute any aspects of the methods and apparatus described herein, such as to implement any of the apparatus of FIGS. 1 and 2 or any of the methods described in relation to FIGS. 3-5.

The computing device 600 may comprise a baseboard, or "motherboard," which is a printed circuit board to which a multitude of components or devices may be connected by way of a system bus or other electrical communication paths. One or more central processing units (CPUs or "processors") 604 may operate in conjunction with a chipset 606. The CPU(s) 604 may be standard programmable processors that perform arithmetic and logical operations necessary for the operation of the computing device 600.

The CPU(s) 604 may perform the necessary operations by transitioning from one discrete physical state to the next through the manipulation of switching elements that differentiate between and change these states. Switching elements may generally comprise electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, or the like.

The CPU(s) 604 may be augmented with or replaced by other processing units, such as GPU(s) 605. The GPU(s) 605 may comprise processing units specialized for but not necessarily limited to highly parallel computations, such as graphics and other visualization-related processing.

A chipset 606 may provide an interface between the CPU(s) 604 and the remainder of the components and devices on the baseboard. The chipset 606 may provide an interface to a random-access memory (RAM) 608 used as the main memory in the computing device 600. The chipset 606 may provide an interface to a computer-readable storage medium, such as a read-only memory (ROM) 620 or non-volatile RAM (NVRAM) (not shown), for storing basic routines that may help to start up the computing device 600 and to transfer information between the various components and devices. ROM 620 or NVRAM may also store other software components necessary for the operation of the computing device 600 in accordance with the aspects described herein.

The computing device 600 may operate in a networked environment using logical connections to remote computing nodes and computer systems of the system 100. The chipset 606 may comprise functionality for providing network connectivity through a network interface controller (NIC) 622. A NIC 622 may be capable of connecting the computing device 600 to other computing nodes over the system 100. It should be appreciated that multiple NICs 622 may be present in the computing device 600, connecting the computing device to other types of networks and remote computer systems. The NIC 622 may be configured to implement a wired local area network technology, such as IEEE 802.3 ("Ethernet") or the like. The NIC 622 may also comprise any suitable wireless network interface controller capable of wirelessly connecting and communicating with other devices or computing nodes on the system 100. For example, the NIC 622 may operate in accordance with any of a variety of wireless communication protocols, including for example, the IEEE 802.11 ("Wi-Fi") protocol, the IEEE 802.16 or 802.20 ("WiMAX") protocols, the IEEE 802.15.4a ("Zigbee") protocol, the 802.15.3c ("UWB") protocol, or the like.

The computing device 600 may be connected to a mass storage device 628 that provides non-volatile storage (i.e., memory) for the computer. The mass storage device 628 may store system programs, application programs, other program modules, and data, which have been described in greater detail herein. The mass storage device 628 may be connected to the computing device 600 through a storage controller 624 connected to the chipset 606. The mass storage device 628 may consist of one or more physical storage units. A storage controller 624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 600 may store data on a mass storage device 628 by transforming the physical state of the physical storage units to reflect the information being stored. The specific transformation of a physical state may depend on various factors and on different implementations of this description. Examples of such factors may comprise, but are not limited to, the technology used to implement the physical storage units and whether the mass storage device 628 is characterized as primary or secondary storage or the like.

For example, the computing device 600 may store information to the mass storage device 628 by issuing instructions through a storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 may read information from the mass storage device 628 by detecting the physical states or characteristics of one or more particular locations within the physical storage units.

In addition to the mass storage device 628 described herein, the computing device 600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 600.

By way of example and not limitation, computer-readable storage media may comprise volatile and non-volatile, non-transitory computer-readable storage media, and removable and non-removable media implemented in any method or technology. However, as used herein, the term computer-readable storage media does not encompass transitory computer-readable storage media, such as signals. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other non-transitory medium that may be used to store the desired information in a non-transitory fashion.

A mass storage device, such as the mass storage device 628 depicted in FIG. 6, may store an operating system utilized to control the operation of the computing device 600. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 628 may store other system or application programs and data utilized by the computing device 600.

The mass storage device 628 or other computer-readable storage media may also be encoded with computer-executable instructions, which, when loaded into the computing device 600, transforms the computing device from a general-purpose computing system into a special-purpose computer capable of implementing the aspects described herein. These computer-executable instructions transform the computing device 600 by specifying how the CPU(s) 604 transition between states, as described herein. The computing device 600 may have access to computer-readable storage media storing computer-executable instructions, which, when executed by the computing device 600, may perform the methods described in relation to FIGS. 3-5.

A computing device, such as the computing device 600 depicted in FIG. 6, may also comprise an input/output controller 632 for receiving and processing input from a number of input devices, such as a keyboard, a mouse, a touchpad, a touch screen, an electronic stylus, or other type of input device. Similarly, an input/output controller 632 may provide output to a display, such as a computer monitor, a flat-panel display, a digital projector, a printer, a plotter, or other type of output device. It will be appreciated that the computing device 600 may not comprise all of the components shown in FIG. 6, may comprise other components that are not explicitly shown in FIG. 6, or may utilize an architecture completely different than that shown in FIG. 6.

As described herein, a computing device may be a physical computing device, such as the computing device 600 of FIG. 6. A computing device may also comprise a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems described herein are not limited to specific methods, specific components, or to particular implementations. It is also to be understood that the terminology used herein is not intended to be limiting.

As used in the specification and the appended claims, the singular forms "a," "an," and "the" comprise plural referents unless the context clearly dictates otherwise. Ranges may be expressed herein as from "about" one particular value, and/or to "about" another particular value. When such a range is expressed, another example may comprise from the one particular value and/or to the other particular value. It will be further understood that the endpoints of each of the ranges are significant both in relation to the other endpoint, and independently of the other endpoint.

"Optional" or "optionally" means that the subsequently described event or circumstance may or may not occur, and that the description comprises instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers, or steps. "Exemplary" means "an example of.". "Such as" is not used in a restrictive sense, but for explanatory purposes.

Components and devices are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any combination of the described methods.

As will be appreciated by one skilled in the art, the methods and systems may take the form of entirely hardware, entirely software, or a combination of software and hardware aspects. Furthermore, the methods and systems may take the form of a computer program product on a computer-readable storage medium having computer-readable instructions (e.g., computer software or program code) embodied in the storage medium. More particularly, the present methods and systems may take the form of web-implemented computer software. Any suitable computer-readable storage medium may be utilized including hard disks, CD-ROMs, optical storage devices, or magnetic storage devices.

The methods and systems are described above with reference to block diagrams and flowcharts of methods, systems, apparatuses, and computer program products. It will be understood that each block of the block diagrams and flowcharts, and combinations of blocks in the block diagrams and flowcharts, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added or removed. The example systems and components described herein may be configured differently than described. For example, elements may be added to, removed from, or rearranged.

It will also be appreciated that various items are shown as being stored in memory or on storage while being used, and that these items or portions thereof may be transferred between memory and other storage devices for purposes of memory management and data integrity. Alternatively, some or all of the software modules and/or systems may execute in memory on another device and communicate with the shown computing systems via inter-computer communication. Furthermore, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms. Accordingly, the present invention may be practiced with other computer system configurations.

While the methods and systems have been described in connection with specific examples, it is not intended that the scope be limited to the specific examples set forth.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including matters of logic with respect to arrangement of steps or operational flow and the plain meaning derived from grammatical organization or punctuation.

It will be apparent to those skilled in the art that various modifications and variations may be made without departing from the scope or spirit of the present disclosure. Alternatives will be apparent to those skilled in the art from consideration of the specification and practices described herein. It is intended that the specification and example figures be considered as exemplary only, with a true scope and spirit being indicated by the following claims.

What is claimed is:

1. A method comprising:
receiving, from a user device, a request for a content item associated with a content provider, wherein a first copy of the content item is stored at a first content origin server device associated with the content provider and a second copy of the content item is stored at a second content origin server device associated with the content provider;
sending, to the first content origin server device and the second content origin server device, an indication of the request for the content item;
determining, based on a response by the first content origin server device, at least one of a first quality score or a first recording score associated with the first copy of the content item; and
sending, to the user device and based on the at least one of the first quality score or the first recording score, a portion of the first copy of the content item.

2. The method of claim 1, wherein receiving, from the user device, the request for the content item further comprises:
receiving a device type associated with the user device; and
receiving at least one capability associated with the user device.

3. The method of claim 2, wherein the sending, to the first content origin server device and the second content origin server device, the indication of the request further comprises sending, to the first content origin server device and the second content origin server device, the device type associated with the user device and the at least one capability associated with the user device.

4. The method of claim 2, wherein sending the portion of the first copy of the content item to the user device is based at least in part on at least one of the device type associated with the user device or the at least one capability associated with the user device.

5. The method of claim 1, wherein the portion of the first copy of the content item is a first portion of the first copy of the content item, further comprising:
   determining a second quality score associated with a second portion of the first copy of the content item fails to satisfy a threshold quality score;
   determining a third quality score associated with the second portion of the second copy of the content item satisfies the threshold quality score; and
   sending, by the second content origin server device and to the user device, the second portion of the second copy of the content item.

6. The method of claim 1, wherein the portion of the first copy of the content item is a first portion of the first copy of the content item, further comprising:
   determining a second recording score associated with a second portion of the first copy of the content item fails to satisfy a threshold recording score;
   determining a third recording score associated with the second portion of the second copy of the content item satisfies the threshold recording score; and
   sending, by the second content origin server device and to the user device, the second portion of the second copy of the content item.

7. The method of claim 1, wherein the storing the first copy of the content item at the first content origin server device and the storing the second copy of the content item at the second content origin server device is based at least in part on receiving, from the user device, a request to record the content item.

8. The method of claim 7, wherein the storing the first copy of the content item at the first content origin server device further comprises caching the first copy of the content item at the first content origin server device based at least in part on the receiving the request to record the content item.

9. The method of claim 8, further comprising determining a quantity of requests for the content item from a plurality of user devices, and caching, based at least in part on the quantity of requests satisfying a threshold quantity of requests, at least one additional copy of the content item.

10. A method comprising:
    receiving a request for a content item associated with a content provider;
    determining a plurality of stored copies of the content item associated with the content provider, wherein at least two of the stored copies of the plurality of stored copies are stored at separate content origin server devices;
    determining at least one of a first quality score or a first recording score associated with a portion of a first stored copy of the plurality of stored copies of the content item; and
    sending, based at least in part on a determination that at least one of the first quality score or the first recording score satisfies a threshold score, the portion of the first stored copy of the content item.

11. The method of claim 10, wherein the receiving the request for the content item comprises receiving the request from a user device.

12. The method of claim 11, wherein receiving the request for the content item further comprises:
    receiving a device type associated with the user device; and
    receiving at least one capability associated with the user device.

13. The method of claim 12, wherein determining to send the portion of the first stored copy of the content item is based at least in part on at least one of the device type associated with the user device or the at least one capability associated with the user device.

14. The method of claim 10, wherein the portion of the first stored copy of the content item is a first portion of the first stored copy of the content item, further comprising:
    determining at least one of a second quality score or a second recording score associated with a second portion of the first stored copy of the content item fails to satisfy at least one of a threshold quality score or a threshold recording score;
    determining at least one of a third quality score or a third recording score associated with the second portion of a second stored copy of the content item satisfies at least one of the threshold quality score or the threshold recording score; and
    sending the second portion of the second stored copy of the content item.

15. The method of claim 10, further comprising determining a quantity of requests associated with the content item from at least one user device, and storing, based at least in part on the quantity of requests reaching a threshold quantity of requests, at least one additional copy of the content item.

16. A method comprising:
    receiving, at a computing device and from a user device, a request to store a recording of a content item associated with a content provider and a time associated with an output of the content item by the user device;
    causing storing, at a first content origin server device associated with the content provider, a first recording of the content item;
    causing storing, at a second content origin server device associated with the content provider, a second recording of the content item;
    sending, at the time associated with the output of the content item and to the first content origin server device and the second content origin server device, a request for the recording of the content item;
    determining, based on a response by the content origin first server device, at least one of a first quality score or a first recording score associated with the first recording of the content item;
    determining, based on a response by the second content origin server device, at least one of a second quality score or a second recording score associated with the second recording of the content item; and
    sending, to the user device and based on at least one of a comparison of the first quality score and the second quality score, or a comparison of the first recording score and the second recording score, a portion of the first recording of the content item.

17. The method of claim 16, wherein receiving, from the user device, the request for the content item further comprises:
    receiving a device type associated with a user device associated with the request; and
    receiving at least one capability associated with the user device.

18. The method of claim 17, wherein determining to send the portion of the first recording of the content item to the user device is based at least in part on at least one of the device type associated with the user device or the at least one capability associated with the user device.

19. The method of claim 18, wherein the portion of the first recording of the content item is a first portion of the first recording of the content item, further comprising:
   determining at least one of a third quality score or a third recording score associated with a second portion of the first recording of the content item fails to satisfy at least one of a threshold quality score or a threshold recording score;
   determining at least one of a fourth quality score or a fourth recording score associated with the second portion of the second recording of the content item satisfies at least one of the threshold quality score or the threshold recording score; and
   sending, to the user device, the second portion of the second recording of the content item.

20. The method of claim 16, wherein storing the first recording of the content item at the first content origin server device comprises caching, at the first content origin server device, the first recording of the content item based at least in part on the receiving the request to store the recording of the content item.

21. The method of claim 16, further comprising determining a quantity of requests, via a plurality of user devices, to store the recording of the content item, and storing, based at least in part on the quantity of requests satisfying a threshold quantity of requests, at least one additional recording of the content item.

* * * * *